(12) United States Patent
Sajiki (10) Patent No.: US 11,807,163 B2
(45) Date of Patent: Nov. 7, 2023

(54) SIREN CONTROL METHOD, INFORMATION PROCESSING APPARATUS, AND NON-TRANSITORY COMPUTER READABLE MEDIUM

(71) Applicant: TOYOTA JIDOSHA KABUSHIKI KAISHA, Aichi-ken (JP)

(72) Inventor: Atsushi Sajiki, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/804,098

(22) Filed: May 26, 2022

(65) Prior Publication Data

US 2022/0379808 A1    Dec. 1, 2022

(30) Foreign Application Priority Data

May 27, 2021    (JP) ................................. 2021-089532

(51) Int. Cl.
| | | |
|---|---|---|
| *B60Q 5/00* | (2006.01) | |
| *G08G 1/0965* | (2006.01) | |
| *G08G 1/005* | (2006.01) | |
| *B64C 39/02* | (2023.01) | |
| *G05D 1/10* | (2006.01) | |
| *G05D 1/02* | (2020.01) | |
| *B64U 101/20* | (2023.01) | |

(52) U.S. Cl.
CPC ............ *B60Q 5/005* (2013.01); *B64C 39/024* (2013.01); *G08G 1/005* (2013.01); *G08G 1/0965* (2013.01); *B64U 2101/20* (2023.01); *G05D 1/021* (2013.01); *G05D 1/101* (2013.01)

(58) Field of Classification Search
CPC ....... B60Q 5/005; G08G 1/005; G08G 1/0965
See application file for complete search history.

(56) References Cited

U.S. PATENT DOCUMENTS

| | | | |
|---|---|---|---|
| 10,210,756 B2* | 2/2019 | Arunachalam | ...... G08G 1/0965 |
| 10,482,869 B1* | 11/2019 | Conlon | ............ G10K 11/17853 |
| 10,909,847 B1* | 2/2021 | Libin | .................... G08G 1/0965 |
| 11,282,383 B1* | 3/2022 | Libin | ..................... G06N 20/00 |
| 11,458,891 B1* | 10/2022 | Kuehner | ................. H04R 1/323 |
| 2007/0159354 A1* | 7/2007 | Rosenberg | ........... G08G 1/0965 |
| | | | 340/902 |
| 2019/0027032 A1* | 1/2019 | Arunachalam | ...... G08G 1/0965 |
| 2021/0023987 A1* | 1/2021 | Bader | .................. B60Q 1/2611 |
| 2022/0363261 A1* | 11/2022 | Buck | ..................... G08G 1/0965 |
| 2022/0379808 A1* | 12/2022 | Sajiki | ..................... B60Q 5/005 |

FOREIGN PATENT DOCUMENTS

| | | |
|---|---|---|
| JP | 2001-249673 A | 9/2001 |
| JP | 2013-61728 A | 4/2013 |

* cited by examiner

*Primary Examiner* — Hoi C Lau
(74) *Attorney, Agent, or Firm* — HAUPTMAN HAM, LLP (57) ABSTRACT

A controller is configured to acquire primary information indicating that an emergency vehicle during emergency driving has satisfied the condition that the emergency vehicle has entered a particular area in which right of way may be given and/or the condition that the emergency vehicle has shifted into a specific driving mode in which right of way may be given within the particular area. Upon acquisition of the primary information, the controller stops a siren of the emergency vehicle or reduces the volume of the siren of the emergency vehicle.

18 Claims, 7 Drawing Sheets

SIREN CONTROL METHOD, INFORMATION PROCESSING APPARATUS, AND NON-TRANSITORY COMPUTER READABLE MEDIUM

CROSS-REFERENCE TO RELATED APPLICATION

This application claims priority to Japanese Patent Application No. 2021-089532, filed on May 27, 2021, the entire contents of which are incorporated herein by reference.

TECHNICAL FIELD

The present disclosure relates to a siren control method, an information processing apparatus, and a non-transitory computer readable medium.

BACKGROUND

Emergency vehicles conventionally sound sirens to notify surrounding vehicles, pedestrians, or the like that they are on the way so that they may be given right of way on roads toward their destinations. Siren sounds may, however, be perceived as unpleasant by nearby residents, especially at night or in quiet residential areas. An electronic siren has therefore been proposed that can produce an audibly soft and low volume siren sound in a residential mode when used at night or in quiet residential areas, by adjusting the frequency and output of the siren sound (for example, Patent Literature 1).

CITATION LIST

Patent Literature

PTL 1: JP 2001-249673 A

SUMMARY

When it is assumed that emergency vehicles may be given right of way by other means than sirens in a particular area, the need for and importance of siren sound within the particular area is different from that outside. There is room for improvement in a siren control method for an emergency vehicle during emergency driving in the particular area.

It would be helpful to provide a siren control method, an information processing apparatus, and a non-transitory computer readable medium that can prevent siren sound from an emergency vehicle from causing a sense of displeasure among nearby residents in a particular area in which the emergency vehicle may be given right of way.

A siren control method according to an embodiment of the present disclosure is a siren control method for an emergency vehicle that is executed by a controller, the siren control method including, upon acquisition of primary information indicating that the emergency vehicle during emergency driving has satisfied the condition that the emergency vehicle has entered a particular area in which right of way may be given and/or the condition that the emergency vehicle has shifted into a specific driving mode in which right of way may be given within the particular area, stopping a siren of the emergency vehicle or reducing the volume of the siren of the emergency vehicle.

An information processing apparatus according to an embodiment of the present disclosure includes a communication interface and a controller. The communication interface is configured to be communicable with an emergency vehicle. The controller is configured to acquire, via the communication interface, primary information indicating that the emergency vehicle during emergency driving has satisfied the condition that the emergency vehicle has entered a particular area in which right of way may be given and/or the condition that the emergency vehicle has shifted into a specific driving mode in which right of way may be given within the particular area, and upon acquisition of the primary information, transmit instructions to stop a siren of the emergency vehicle or to reduce the volume of the siren of the emergency vehicle to the emergency vehicle via the communication interface.

A non-transitory computer readable medium according to an embodiment of the present disclosure stores a program configured to cause a computer, upon acquisition of primary information indicating that an emergency vehicle during emergency driving has satisfied the condition that the emergency vehicle has entered a particular area in which right of way may be given and/or the condition that the emergency vehicle has shifted into a specific driving mode in which right of way may be given within the particular area, to perform processing for stopping a siren of the emergency vehicle or for reducing the volume of the siren of the emergency vehicle.

According to the present disclosure, a siren control method, an information processing apparatus, and a non-transitory computer readable medium that can prevent siren sound from an emergency vehicle from causing a feeling of displeasure among nearby residents in a particular area in which the emergency vehicle may be given right of way can be provided.

DETAILED DESCRIPTION

An embodiment of the present disclosure will be described below, with reference to the drawings.

(Overall Configuration)

Figure 1:
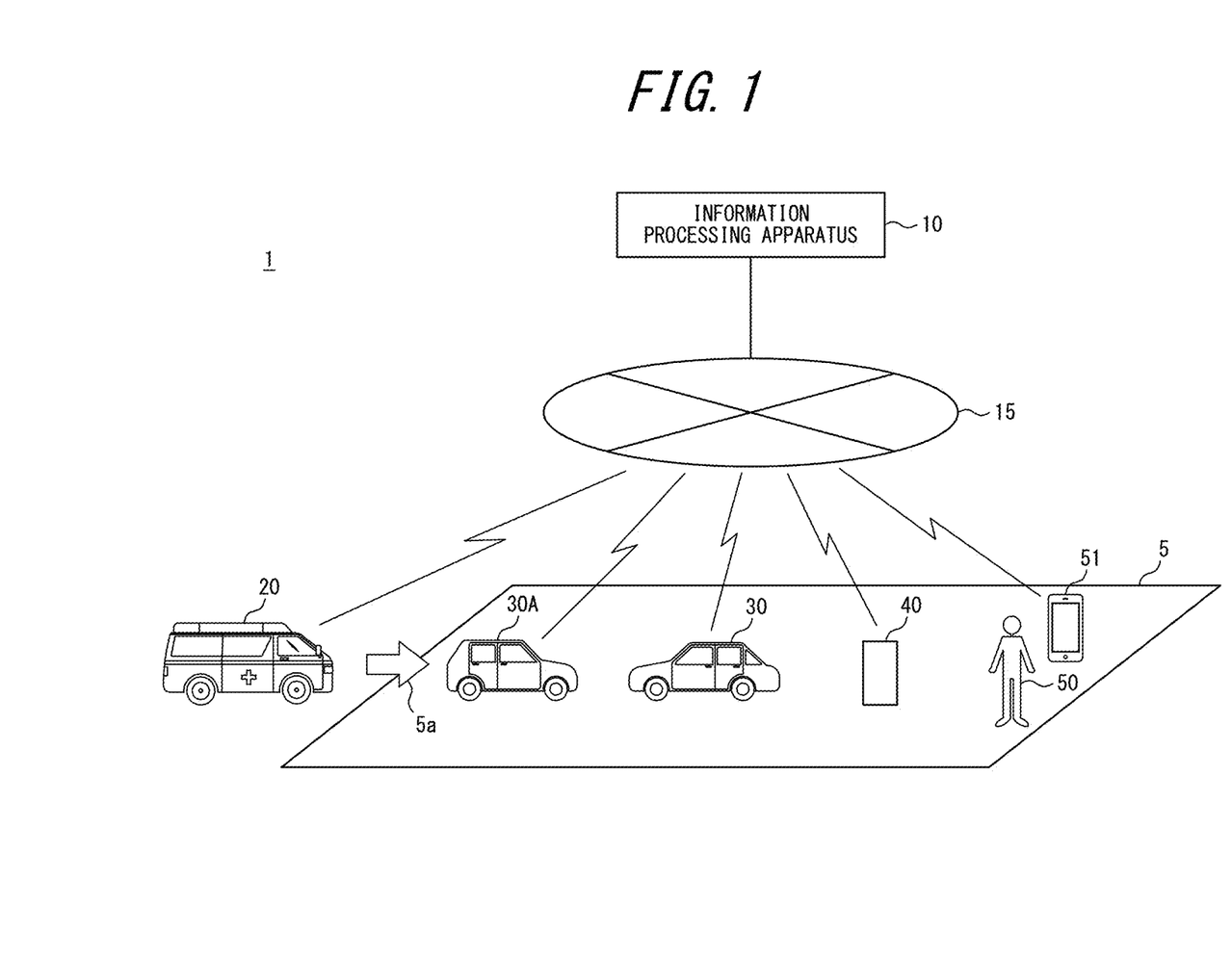
FIG. 1 is a block diagram illustrating a schematic configuration of a siren control system according to an embodiment of the present disclosure.

FIG. 1 is a diagram illustrating a schematic configuration of an information processing system 1 according to an embodiment of the present disclosure. The information processing system 1 includes an information processing apparatus 10 and an emergency vehicle 20. The information processing apparatus 10 is configured to be communicable with emergency vehicles 20. The information processing apparatus 10 is further configured to be communicable with a plurality of automated driving vehicles 30, a plurality of roadside control apparatuses 40, and/or a plurality of portable information processing apparatuses 51 in the possession of a plurality of pedestrians 50. One of the automated driving vehicles 30 may be assigned as a lead vehicle 30A that leads an emergency vehicle 20 in a particular area 5.

Communications between the information processing apparatus 10, emergency vehicles 20, automated driving vehicles 30, roadside control apparatuses 40, and portable information processing apparatuses 51 may be performed via a communication network 15. The communication network 15 is a network capable of covering at least intercommunications between information devices within the particular area 5. Emergency vehicles 20, automated driving vehicles 30, roadside control apparatuses 40, and portable information processing apparatuses 51 may be connected to the communication network 15 by wireless communications, such as the 4th Generation (4G) mobile communication system, the 5th Generation (5G) mobile communication system, Wi-Fi® (Wi-Fi is a registered trademark in Japan, other countries, or both), or Worldwide Interoperability for Microwave Access (WiMAX).

The information processing apparatus 10 can control traffic, such as automated driving vehicles 30 and pedestrians 50, within the particular area 5. The particular area 5 is an area in which urban functions, including traffic, are upgraded using sensors installed in road infrastructures and automated driving vehicles 30, as well as digital technology. The particular area 5 can be referred to as a smart city, for example.

Within the particular area 5, driving on a road is in principle restricted only to automated driving vehicles 30 having automated driving functions, with the exception of emergency vehicles 20 that enter from outside the particular area 5. Automated driving may be implemented, for example, at Level 4 or Level 5 as defined by the Society of Automotive Engineers (SAE), but is not limited to this example. Automated driving may be implemented based on other definitions. Within the particular area 5, driving of each of the plurality of automated driving vehicles 30 is adjusted, for example, by acquiring information on the surrounding environment from a plurality of sensors, by communicating directly with other automated driving vehicles 30, or by receiving instructions or control from the information processing apparatus 10. For this reason, it is not necessary for traffic lights or road signs to be present within the particular area 5.

In a case in which an accident, an incident, or transport of a sick person occurs in the particular area 5, an emergency vehicle 20, such as ambulance or a fire truck, may enter the particular area 5 from outside the particular area 5. In that case, the information processing apparatus 10 can control automated driving vehicles 30, roadside control apparatuses 40, and portable information processing apparatuses 51 so that the emergency vehicle 20 during emergency driving may be given right of way. Accordingly, within the particular area 5, the emergency vehicle 20 does not need to sound the siren or have little need for sounding the siren. The information processing apparatus 10 can therefore perform processing for stopping the siren of the emergency vehicle 20 or processing for reducing the volume of the siren of the emergency vehicle 20.

Hereinafter, the configuration of the components of the information processing system 1 in the embodiment will be described.

(Information Processing Apparatus)

Figure 2:
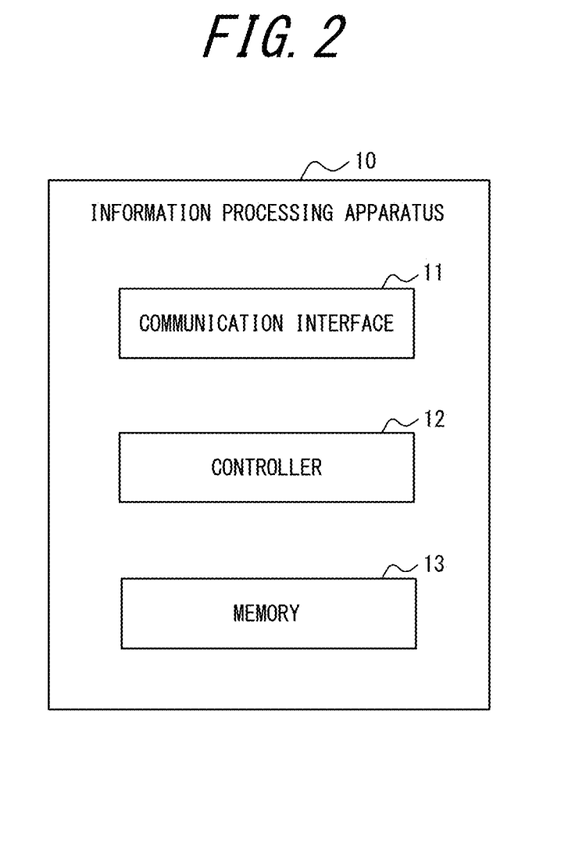
FIG. 2 is a block diagram illustrating a schematic example configuration of an information processing apparatus of FIG. 1.

The information processing apparatus 10 is a computer that controls traffic in the particular area 5. Functions of the information processing apparatus 10 may be implemented on a single computer or distributed on a plurality of computers that are communicable with each other via the communication network 15. As an example, the information processing apparatus 10 includes a communication interface 11, a controller 12, and a memory 13, as illustrated in FIG. 2.

The communication interface 11 includes a communication module and is configured to be communicable with an emergency vehicle 20, automated driving vehicles 30, roadside control apparatuses 40, and portable information processing apparatuses 51 via the communication network 15. The communication interface 11 can perform processing, such as protocol processing pertaining to information transmission and receipt, modulation of transmitted signals, or demodulation of received signals.

The controller 12 controls the entire information processing apparatus 10 and executes various arithmetic processes. Processing executed by the information processing apparatus 10 can be referred to as processing executed by the controller 12. The controller 12 includes at least one processor. The controller 12 may include various processors. Processors may include general purpose processors that execute programmed functions by loading a specific program, and dedicated processors that are dedicated to specific processing. Dedicated processors may include Digital Signal Processors (DSPs), Application Specific Integrated Circuits (ASICs), Field-Programmable Gate Arrays (FPGAs), and the like. The controller 12 may further include a memory. The memory can store programs executed by processors, information being operated by the processors, or the like.

The controller 12 can collect information from a plurality of automated driving vehicles 30 and a plurality of roadside control apparatuses 40 via the communication interface 11. Information collected by the controller 12 may include positional information and speed information for each automated driving vehicle 30, as well as information collected by roadside sensors. Based on the collected information, the controller 12 can calculate a method for optimizing traffic within the particular area 5. Based on a calculation result, the controller 12 can transmit instructions or control information to automated driving vehicles 30 within the particular area 5 via the communication interface 11.

The controller 12 may acquire, from an emergency vehicle 20 that is approaching the particular area 5 and an emergency vehicle 20 that is driving within the particular area 5, current positional information for the emergency vehicles 20 via the communication interface 11. The controller 12 may determine whether an emergency vehicle 20 during emergency driving has satisfied the condition that it has entered the particular area 5, and/or the condition that it has shifted into a specific driving mode in which right of way may be given within the particular area 5. Upon determining that either of the above conditions has been satisfied, the controller 12 executes processing for stopping the siren of the emergency vehicle 20 or for reducing the volume of the siren of the emergency vehicle 20.

The memory 13 may include a semiconductor storage device, a magnetic storage device, and/or an optical storage device. Semiconductor storage devices include Solid State Drive (SSD) using flash memory, or the like. Magnetic storage devices include magnetic tapes, Floppy® disks (Floppy is a registered trademark in Japan, other countries, or both), hard disks, etc., and drive apparatuses thereof. Optical storage devices include, for example, Compact Discs (CDs), Digital Versatile Discs (DVDs), and Blu-ray® (Blu-ray is a registered trademark in Japan, other countries, or both), etc., and drive apparatuses thereof.

The memory 13 stores information necessary for the information processing apparatus 10 to control traffic within the particular area 5. The memory 13 stores information registered for automated driving vehicles 30 within the particular area 5, and information registered for pedestrians 50 and portable information processing apparatuses 51 in the possession of the pedestrians 50. The registered information may include information on owners and information on addresses for communications or the like. The memory 13 may sequentially store real-time updated information, such as current positional information, speed, and direction of movement of each automated driving vehicle 30, current positional information for an emergency vehicle 20, or positional information for each pedestrian 50, for processing by the controller 12.

(Emergency Vehicle)

Figure 3:
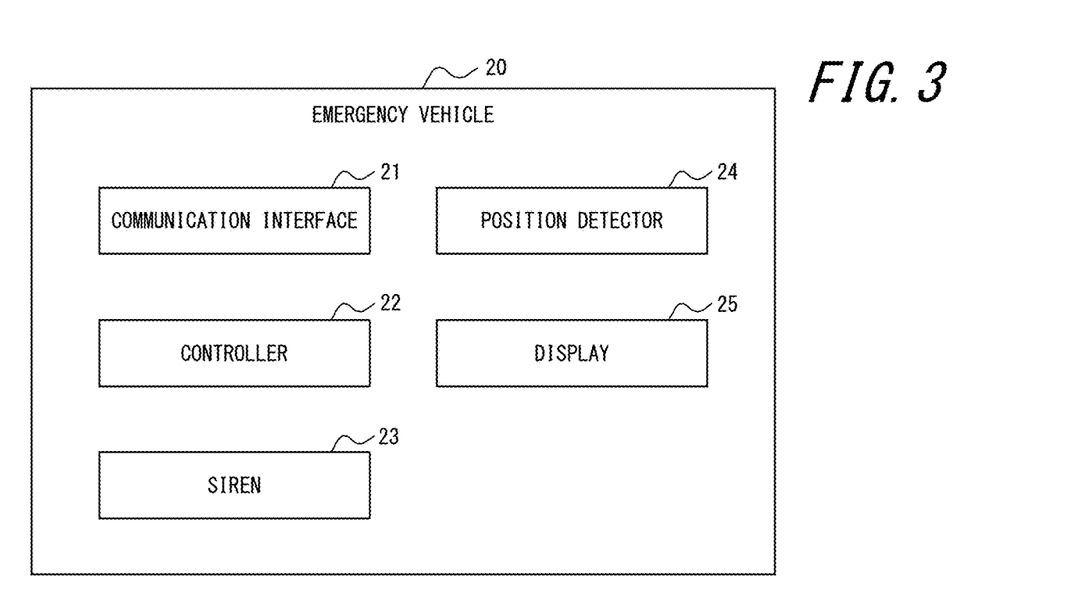
FIG. 3 is a block diagram illustrating a schematic example configuration of an emergency vehicle of FIG. 1.

An emergency vehicle 20 is configured with a communication interface 21, a controller 22, and a siren 23, as illustrated for example in FIG. 3. In addition to the components illustrated in FIG. 3, the emergency vehicle 20 includes components needed to be driven by a driver as a normal vehicle.

The communication interface 21 includes a communication module. The communication interface 21 is configured to be communicable with the information processing apparatus 10 via the communication network 15. The communication interface 21 may be configured to be communicable with the information processing apparatus 10 via a communication path other than the communication network 15.

The controller 22 may be configured with at least one processor. The controller 22 may transmit and receive information to and from the information processing apparatus 10 via the communication interface 21. The controller 22 may transmit information indicating that an emergency vehicle 20 is about to enter the particular area 5, and information on its destination within the particular area 5, to the information processing apparatus 10. A driver of the emergency vehicle 20 may transmit the above information to an operator of the information processing apparatus 10 by voice, without using data communications by the controller 22. The controller 22 may acquire information on a lead vehicle 30A to be followed, from the information processing apparatus 10 via the communication interface 21. Further, the controller 22 can perform control to start or stop the siren 23, adjust the volume, etc.

The siren 23 includes a siren sound control apparatus and a speaker. The siren 23 can produce siren sound during emergency driving of the emergency vehicle 20 under control of the controller 22. The siren 23 is used in a general traffic environment outside the particular area 5 during emergency driving of the emergency vehicle 20, so as to notify surrounding vehicles and pedestrians that the emergency vehicle 20 is passing through.

The emergency vehicle 20 may further include a position detector 24 and a display 25.

The position detector 24 detects positional information for the emergency vehicle 20. The position detector 24 may include a Global Positioning System (GPS) receiver. By using signals from a GPS receiver, information on the latitude and longitude at the current location of the emergency vehicle 20 can be acquired. The GPS receiver can measure the position of the vehicle using satellites. Additionally, instead of or in addition to the GPS receiver, a receiver compliant with a different Global Navigation Satellite System (GNSS) may be employed. The different GNSS includes, for example, a satellite positioning system using quasi-zenith satellites.

The controller 22 of the emergency vehicle 20 may sequentially transmit positional information acquired from the position detector 24 to the information processing apparatus 10 via the communication interface 21. This allows the information processing apparatus 10 to determine the position of the emergency vehicle 20 approaching the particular area 5. The information processing apparatus 10 can also estimate a time of arrival of the emergency vehicle 20 at the particular area 5. The information processing apparatus 10 can cause the lead vehicle 30A to travel to the vicinity of an entrance 5A to the particular area 5 in accordance with the estimated time of arrival. Further, the information processing apparatus 10 can recognize that the emergency vehicle 20 has entered the particular area 5.

The display 25 can present information to the driver of the emergency vehicle 20, based on a signal from the controller 22. Various displays, such as a Liquid Crystal Display (LCD), an organic Electro-Luminescence (EL) display, an inorganic EL display, a Plasma Display Panel (PDP), or a Field Emission Display (FED), may be used as the display 25. The display 25 may also be a Head Up Display (HUD).

For example, the display 25 presents that the lead vehicle 30A is to be followed within the particular area 5. The display 25 may present identification information, such as a license plate number, for identifying the lead vehicle 30A. The emergency vehicle 20 may be configured to inform the driver that the lead vehicle 30A is to be followed, together with identification information for the lead vehicle 30A, by using voice from a speaker, instead of presenting it on the display 25.

(Automated Driving Vehicle)

Figure 4:
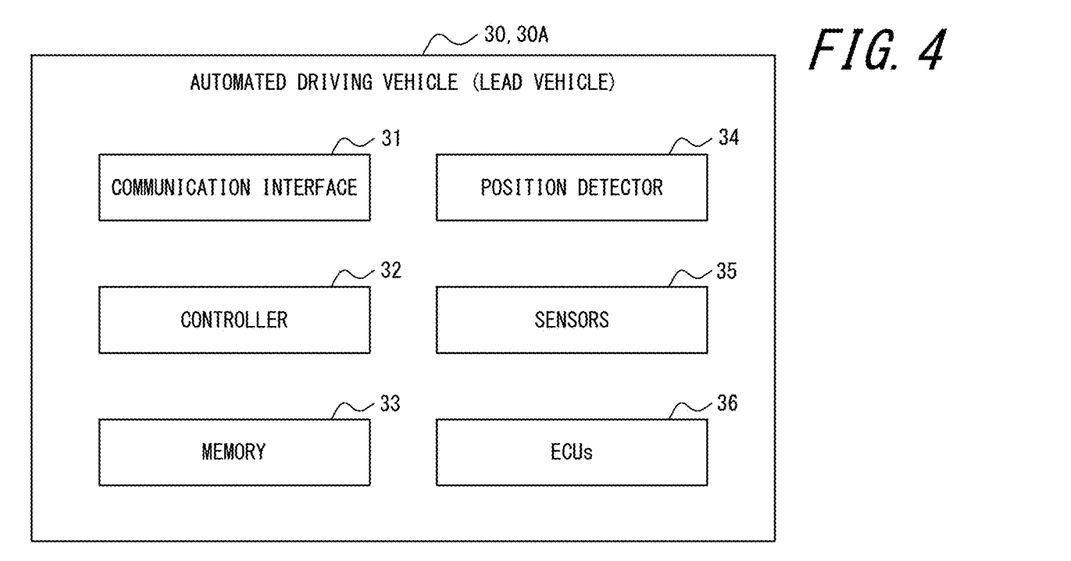
FIG. 4 is a block diagram illustrating a schematic example configuration of an automated driving vehicle of FIG. 1.

An automated driving vehicle 30 includes a communication interface 31, a controller 32, a memory 33, a position detector 34, a plurality of sensors 35, and a plurality of Electronic Control Units (ECUs) 36, as illustrated in FIG. 4. A lead vehicle 30A may be configured to be identical to the automated driving vehicle 30.

The communication interface 31 is configured to be communicable with the information processing apparatus 10 via the communication network 15. The communication interface 31 may, for example, be an in-vehicle communication device. The communication interface 31 may include a communication module that connects to the communication network 15. The communication interface 31 may further be configured to be communicable with other automated driving vehicles 30 and roadside control apparatuses 40. The communication interface 31 may be able to communicate with other automated driving vehicles 30 and roadside control apparatuses 40 via the communication network 15 or directly without using the communication network 15.

The controller 32 controls the components included in the automated driving vehicle 30. Processing executed by the automated driving vehicle 30 can be referred to as processing executed by the controller 32. The controller 32 may include at least one processor. The controller 32 may include various processors, as is the case with the controller 12 of the information processing apparatus 10. The controller 32 may also include various memories, as is the case with the controller 12 of the information processing apparatus 10.

The memory 33 stores information necessary for the automated driving vehicle 30 to drive within the particular area 5. For example, the memory 33 may store map information within the particular area 5, a destination during travel, and route information. The memory 33 may include a semiconductor storage device, a magnetic storage device, and/or an optical storage device, as is the case with the memory 13 of the information processing apparatus 10.

The position detector 34 detects the position of the automated driving vehicle 30. The position detector 34 may include a Global Positioning System (GPS) receiver, or a receiver compliant with a different Global Navigation Satellite System (GNSS), as is the case with the position detector 24 of an emergency vehicle 20. The position detector 34 is not limited to the one using GNSS such as GPS. Any other positioning technique that is capable of positioning within the particular area 5 may be used. The controller 32 may acquire positional information for the automated driving vehicle 30 detected by the position detector 34 and sequentially transmit the acquired positional information to the information processing apparatus 10 via the communication interface 31.

The sensors 35 include a variety of different sensors 35 that are mounted on the automated driving vehicle 30. The sensors 35 include, for example, sensors for detecting speed, acceleration, inter-vehicle distance, direction, the presence of nearby objects, or the like. The sensors 35 may include a camera, a Light Detection and Ranging (LiDAR) sensor, a millimeter wave radar, an accelerometer, and a gyro sensor.

The ECUs 36 are a plurality of electronic control apparatuses that control the components of the automated driving vehicle 30. The components of the automated driving vehicle 30 include, but are not limited to, a motor or engine, a brake, a transmission, steering, and a navigation system.

The communication interface 31, the controller 32, the memory 33, the position detector 34, the sensors 35, and the ECUs 36 of the automated driving vehicle 30 are communicably connected to each other via an in-vehicle communication network, such as a Controller Area Network (CAN). The controller 32 can control the ECUs 36, based on information on the destination, outputs from the position detector 34 and from the sensors 35, instructions and control information acquired from the information processing apparatus 10 via the communication interface 31, or the like.

(Roadside Control Apparatus)

A roadside control apparatus 40 can acquire information detected by various sensors located on and in the vicinity of the road and transmit the acquired information to the information processing apparatus 10 via the communication network 15. Information detected by the sensors located on and in the vicinity of the road includes various types of information, such as a congestion state of the road, a road condition such as an icy road surface, or information on vehicles stopping due to an accident or the like. The sensors located on and in the vicinity of the road include a camera, a LiDAR sensor, a millimeter wave radar, or the like.

The roadside control apparatus 40 may further control traffic control equipment located on and in the vicinity of the road. The roadside control apparatus 40 can provide information to pedestrians 50 or guide the pedestrians 50, by controlling an information display apparatus located in the vicinity of the road or by controlling equipment, such as electronically controllable road studs, installed on the road. The roadside control apparatus 40 may receive, from the information processing apparatus 10, control information for controlling the information display apparatus or the road studs.

(Portable Information Processing Apparatus)

A portable information processing apparatus 51 is a small information processing apparatus carried by a pedestrian 50. The portable information processing apparatus 51 includes, for example, a smartphone, a smartwatch, a small personal computer, or the like. The portable information processing apparatus 51 can detect positional information for itself and transmit the detected positional information to the information processing apparatus 10 via the communication network 15. The portable information processing apparatus 51 may include a display for displaying information and/or a speaker for conveying information as audio to the pedestrian 50. When an emergency vehicle 20 is approaching, the pedestrian 50 can receive information on a zone to walk in, from the information processing apparatus 10 via the portable information processing apparatus 51.

(Processing Executed by Controller of Information Processing Apparatus)

In a case in which an emergency vehicle 20 undertakes emergency driving toward its destination within the particular area 5, the controller 12 of the information processing apparatus 10 controls automated driving vehicles 30 within the particular area 5, so that the emergency vehicle 20 may be given right of way within the particular area 5. The information processing apparatus 10 can further control equipment on or in the vicinity of the road in order to provide right of way to the emergency vehicle 20.

The controller 12 can acquire primary information indicating that an emergency vehicle 20 during emergency driving has satisfied the condition that it has entered the particular area 5 and/or the condition that it has shifted into a specific driving mode in which right of way may be given within the particular area 5. For example, the controller 12 can sequentially acquire, from the emergency vehicle 20, positional information detected by the position detector 24 of the emergency vehicle 20. Accordingly, the controller 12 can detect that the emergency vehicle 20 has entered the particular area 5, from positional information for the emergency vehicle 20. The positional information for the emergency vehicle 20 is a type of primary information.

Before acquisition of the primary information, the controller 12 may acquire, from the emergency vehicle 20, secondary information indicating that the emergency vehicle 20 is about to enter the particular area 5, and information on a destination of the emergency vehicle 20. When the emergency vehicle 20 is approaching the particular area 5, the controller 12 can allocate one automated driving vehicle 30 as a lead vehicle 30A to the emergency vehicle 20. The lead vehicle 30A can lead the emergency vehicle 20 to the destination within the particular area 5. A driver of the emergency vehicle 20 can follow the lead vehicle 30A within the particular area 5. By controlling the lead vehicle 30A, the controller 12 can indirectly control the movement of the emergency vehicle 20 within the particular area 5.

The controller 12 may control other automated driving vehicles 30 so that the emergency vehicle 20, which is led by the lead vehicle 30A, may be given right of way within the particular area 5. The lead vehicle 30A may communicate directly with other automated driving vehicles 30 located in the vicinity of its intended driving route via the communication interface 31, and notify the other automated driving vehicles 30 that the emergency vehicle 20 is on the way, so as not to impede the driving. The state in which the emergency vehicle 20 follows the lead vehicle 30A is included in the specific driving mode in which the emergency vehicle 20 may be given right of way. The controller 12 may acquire information indicating that the lead vehicle 30A is leading the emergency vehicle 20, from the lead vehicle 30A. The information indicating that the lead vehicle 30A is leading the emergency vehicle 20 is another type of primary information.

Upon acquisition of any of the above types of primary information, the controller 12 of the information processing apparatus 10 can transmit instructions to stop the siren 23 of the emergency vehicle 20, or instructions to reduce the volume of the siren 23 of the emergency vehicle 20, to the emergency vehicle 20 via the communication interface 11. Upon acquisition of instructions from the information processing apparatus 10 via the communication interface 21, the controller 22 of the emergency vehicle 20 executes processing for stopping the siren 23 or for reducing the volume of the siren 23.

Figure 5:
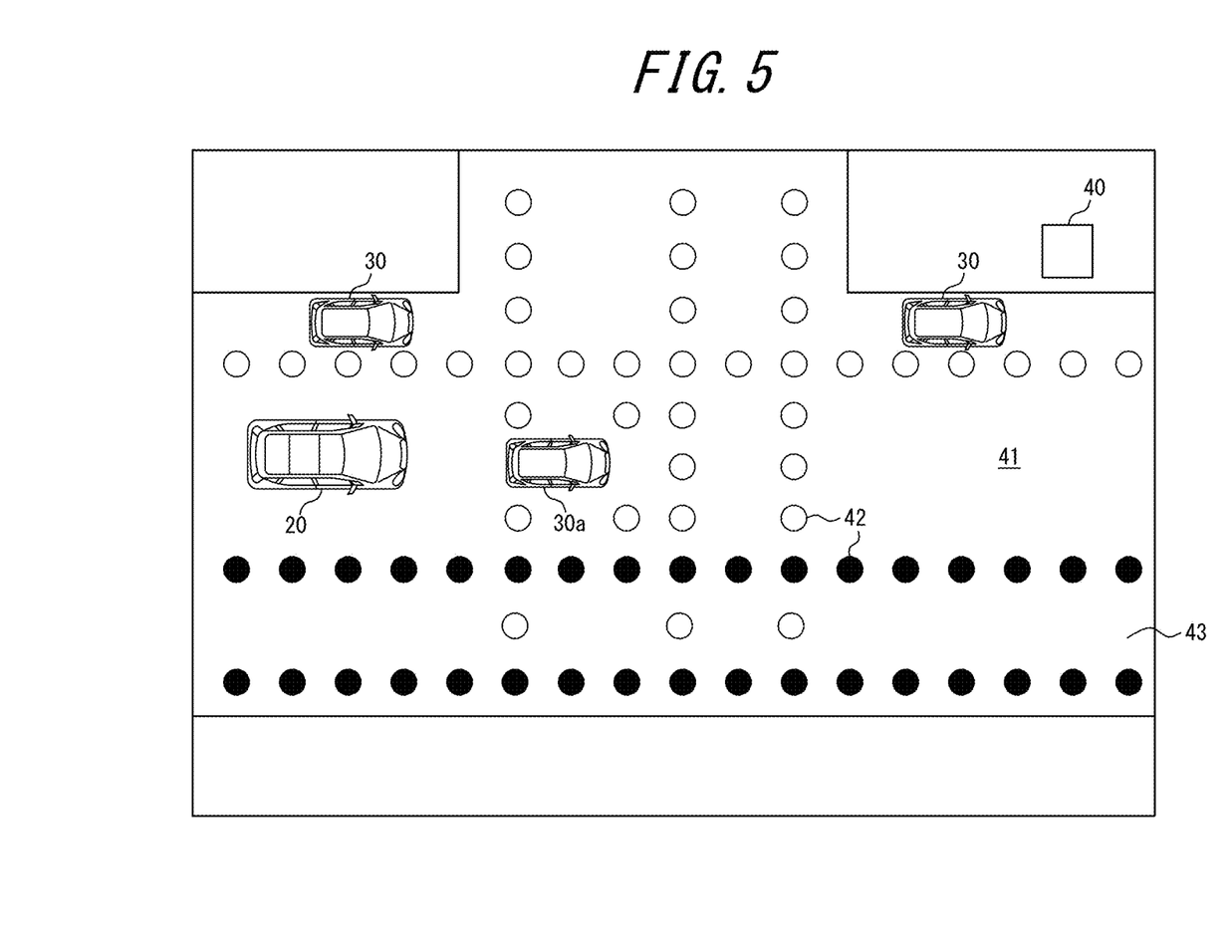
FIG. 5 illustrates an example of vehicle and pedestrian control executed when an emergency vehicle is driving in a particular area.

Next, an example of traffic control in a case in which an emergency vehicle 20 undertakes emergency driving within the particular area 5 will be described with reference to FIG. 5. FIG. 5 illustrates an example of a road 41 within the particular area 5 viewed from above. An emergency vehicle 20 is driving on the road 41 while being led by a lead vehicle 30A. When the emergency vehicle 20 is driving, automated driving vehicles 30 driving near an intersection stop or slow down to the side of the road 41 so as not to impede the driving of the emergency vehicle 20, under control of the information processing apparatus 10 or by instructions from the lead vehicle 30A. The information processing apparatus 10 or the lead vehicle 30A may notify portable information processing apparatuses 51 of pedestrians 50 that the emergency vehicle 20 is approaching.

As an example, the road 41 includes pedestrian guidance equipment in order to ensure that pedestrians 50 do not impede driving of an emergency vehicle 20. The pedestrian guidance equipment includes, for example, a plurality of road studs 42 embedded in the road 41. The road studs 42 include light emitters that can be controlled by roadside control apparatuses 40 between a flashing state and a non-flashing state. The controller 12 of the information processing apparatus 10 can use light to indicate the pedestrians 50 a pedestrian guiding zone 43 for the pedestrians 50 to pass through, by controlling the roadside control apparatuses 40 to selectively cause some road studs 42 to emit light. In FIG. 5, black road studs 42 indicate road studs 42 that are emitting light. In this way, in a road environment in which automated driving vehicles 30 and pedestrians 50 coexist, a pedestrian path can be quickly distinguished, and the pedestrians 50 can be guided toward a safe zone.

Figure 6:
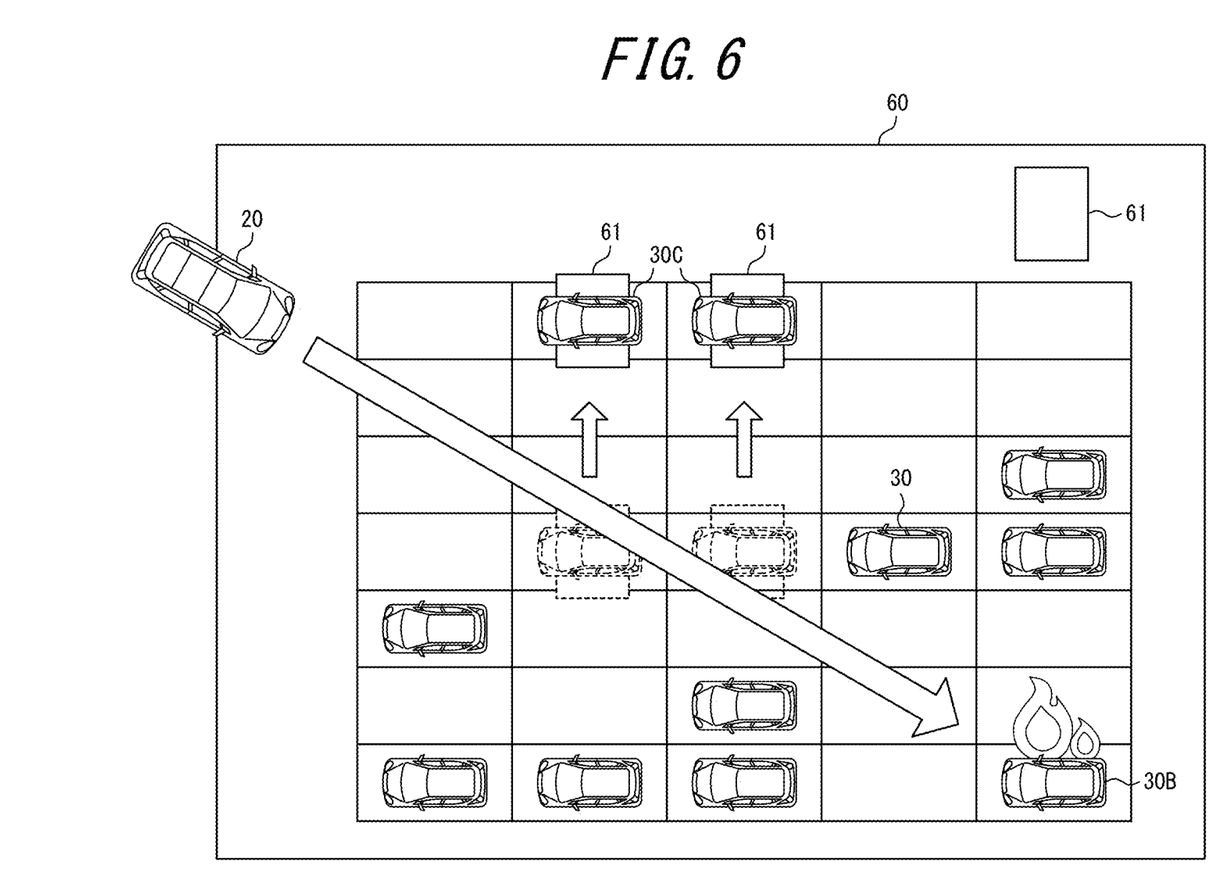
FIG. 6 illustrates an example of processing for moving parked vehicles in a case in which an emergency vehicle is heading to its destination within a parking lot.

As another example, there are cases in which an emergency vehicle 20 can drive across a parking lot 60 as illustrated in FIG. 6. The parking lot 60 is, for example, an automated valet parking in which, after users get out of automated driving vehicles 30 at a drop-off area, the automated driving vehicles 30 automatically drive to their parking positions and park in accordance with instructions from a control apparatus of the parking lot 60. In the automated valet parking, the automated driving vehicles 30 can be parked at a short distance from each other. Sometimes the emergency vehicle 20 can therefore be impeded by parked automated driving vehicles 30, and it may not be able to drive to an affected vehicle 30B, which is its destination within the parking lot 60. In these circumstances, the controller 12 of the information processing apparatus 10 may transmit instructions to move automated driving vehicles 30C within the parking lot 60 that are impeding the driving of the emergency vehicle 20, either directly or indirectly via the control apparatus of the parking lot 60.

Figure 7:
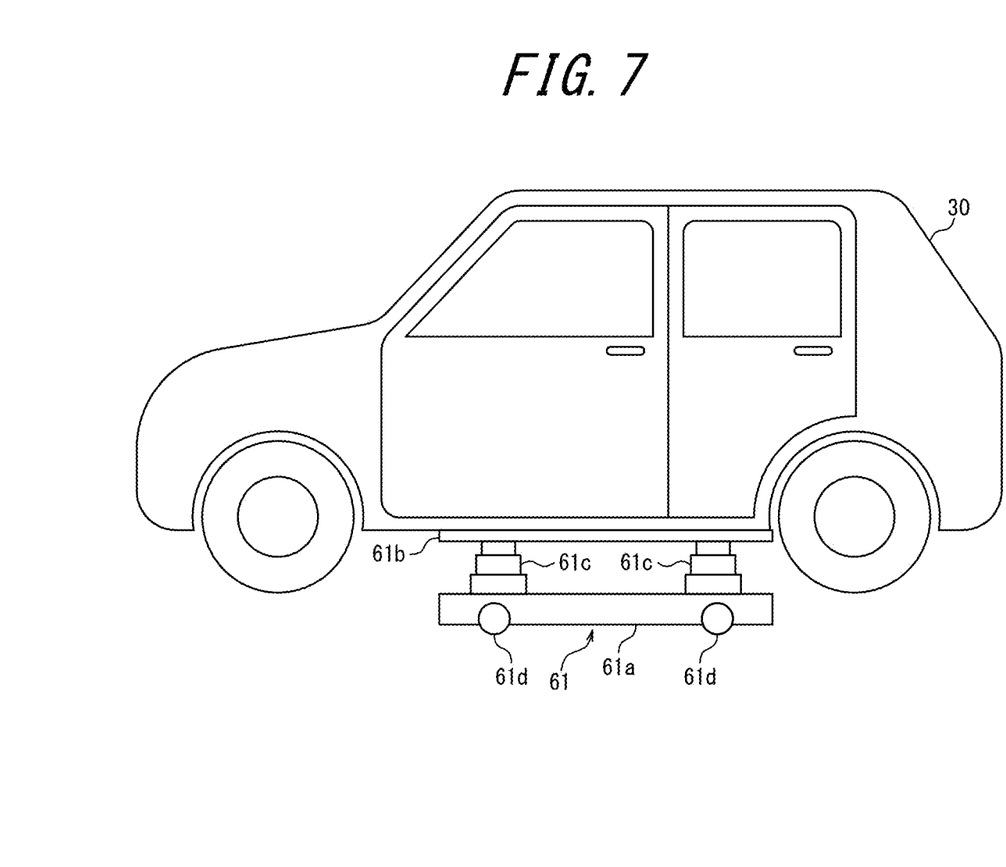
FIG. 7 illustrates an example of a robot that moves vehicles within the parking lot.

There are also cases in which parked automated driving vehicles 30 may not be able to move back and forth within the parking lot 60. In order to move parked automated driving vehicles 30 in those circumstances, the parking lot 60 may be equipped with a robot 61 for moving the automated driving vehicles 30. The robot 61 includes various forms of robots. As an example, the robot 61 may include a body 61a, a loading plate 61b, an elevating mechanism 61c, and wheels 61d, as illustrated in FIG. 7. The robot 61 can enter a space under each automated driving vehicle 30, with the loading plate 61b being lowered, push the vehicle up from below by raising the loading plate 61b using the elevating mechanism 61c, and transport the automated driving vehicle 30 by driving the wheels 61d.

Without being limited to the above examples, the controller 12 of the information processing apparatus 10 can execute various types of processing for providing right of way to an emergency vehicle 20 heading to its destination.

(Processing Flow in Controller of Information Processing Apparatus)

Figure 8:
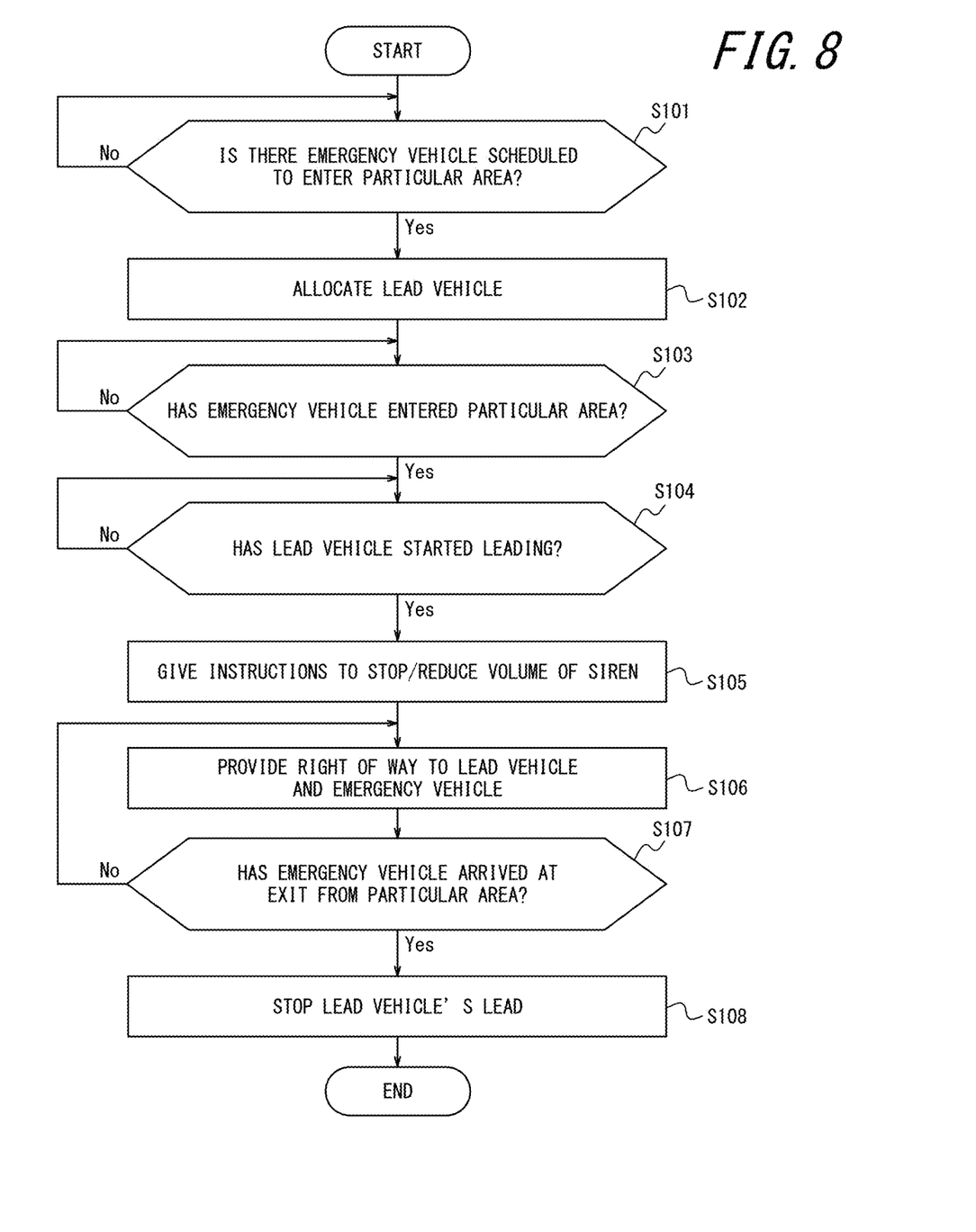
FIG. 8 is a flowchart illustrating example processing executed by a controller of the information processing apparatus.

An example of a processing flow executed by the controller 12 of the information processing apparatus 10 will be described below with reference to FIG. 8. A method disclosed herein can be performed according to a program by a processor included in the information processing apparatus 10. Such a program may be stored in a non-transitory computer readable medium.

First, the controller 12 detects whether there is an emergency vehicle 20 scheduled to enter the particular area 5 (Step S101). When information indicating that an emergency vehicle 20 is to enter the particular area 5 has been acquired from the emergency vehicle 20 or an organization that dispatches the emergency vehicle 20, the controller 12 recognizes that there is an emergency vehicle 20 scheduled to enter the particular area 5. In a case in which there is an emergency vehicle 20 scheduled to enter the particular area 5 (Step S101: Yes), the processing of the controller 12 proceeds to the next Step S102. In a case in which there is no emergency vehicle 20 scheduled to enter the particular area 5 (Step S101: No), the controller 12 repeats Step S101 and wait until it is detected that there is an emergency vehicle 20 that is to enter the particular area 5.

In Step S102, the controller 12 allocates a lead vehicle 30A to the emergency vehicle 20 that is approaching the particular area 5 (Step S102). The lead vehicle 30A can travel to the vicinity of the entrance 5a through which the emergency vehicle 20 is to enter the particular area 5 and wait for arrival of the emergency vehicle 20.

The controller 12 acquires positional information for the emergency vehicle 20 by communicating with the emergency vehicle 20 via the communication interface 11, and determines whether the emergency vehicle 20 has entered the particular area 5 (Step S103). The controller 12 may collect information from sensors placed at the entrance 5a to the particular area 5 for the emergency vehicle 20, so as to determine whether the emergency vehicle 20 has entered the particular area 5. In a case in which the emergency vehicle 20 has entered the particular area 5 (Step S103: Yes), the controller 12 proceeds to the next Step S104. In a case in which the emergency vehicle 20 has not entered the particular area 5 (Step S103: No), the controller 12 repeats Step S103 and waits for the emergency vehicle 20 to arrive at the particular area 5.

In Step S104, the controller 12 determines whether the lead vehicle 30A has started leading the emergency vehicle 20 that has entered the particular area 5 (Step S104). For example, the lead vehicle 30A can detect it when the emergency vehicle 20 starts following the lead vehicle 30A and notify the information processing apparatus 10. Further, the controller 12 can determine whether the lead vehicle 30A has started leading the emergency vehicle 20, for example, from positional information acquired from the emergency vehicle 20 and positional information acquired from the lead vehicle 30A. In a case in which the lead vehicle 30A has started leading (Step S104: Yes), the controller 12 proceeds to the next Step S105. In a case in which the lead vehicle 30A has not started leading (Step S104: No), the controller 12 repeats Step S104 and waits for the lead vehicle 30A to start leading the emergency vehicle 20.

In Step S105, the controller 12 transmits, to the emergency vehicle 20, instructions to stop the siren 23 or to reduce the volume of the siren 23. As a result, in the subsequent driving within the particular area 5, the emergency vehicle 20 does not produce a siren sound, or produces a siren sound only at a relatively low volume. Step S105 may be performed after Step S103 instead of after Step S104. That is, upon determining that the emergency vehicle 20 has entered the particular area 5, the controller 12 may transmit, to the emergency vehicle 20, instructions to stop the siren 23 or to reduce the volume of the siren 23, without waiting for the lead vehicle 30A to start leading.

In the subsequent driving within the particular area 5, the controller 12 provides right of way to the lead vehicle 30A and the emergency vehicle 20 (Step S106). The controller 12 executes various types of processing so that automated driving vehicles 30 and the pedestrians 50 within the particular area 5 do not impede the emergency vehicle 20 during emergency driving.

In a case in which the emergency vehicle 20 does not arrive at an exit from the particular area 5 after it has travelled to the destination within the particular area 5 (Step S107: No), the controller 12 retains right of way for the lead vehicle 30A and the emergency vehicle 20 (Step S106). When the emergency vehicle 20 arrives at the exit from the particular area 5 (Step S107: Yes), the controller 12 causes the lead vehicle 30A to stop leading the emergency vehicle 20 (Step S108). The exit from the particular area 5 may be the same as the entrance 5a to the particular area 5. Once the emergency vehicle 20 moves out of the particular area 5, the processing executed by the controller 12 with respect to the emergency vehicle 20 ends.

As described above, according to the embodiment of the present disclosure, the siren 23 of an emergency vehicle 20 is stopped or the volume of the siren 23 is reduced within the particular area 5, and this prevents siren sound from causing a sense of displeasure among nearby residents or the like in a place within the particular area 5 through which the emergency vehicle 20 passes.

Additionally, the present disclosure is not limited to the above embodiment, and various modifications and revisions may be implemented. For example, functions or the like included in each means, each step, or the like can be rearranged without logical inconsistency, and a plurality of means, steps, or the like can be combined into one or divided.

For example, in the above embodiment, a lead vehicle 30A, which is an automated driving vehicle 30, is used as a mobile object that leads an emergency vehicle 20. The mobile object that leads the emergency vehicle 20 is, however, not limited to an automated driving vehicle 30. For example, a small unmanned aircraft, such as a drone, can be used as the mobile object. In a case in which an unmanned aircraft is used as a mobile object, the unmanned aircraft transmits positional information to the information processing apparatus 10, and its flight is controlled by the information processing apparatus 10, as is the case with a lead vehicle 30A. The unmanned aircraft may also be configured to communicate with surrounding automated driving vehicles 30 so as to ensure that the emergency vehicle 20 may be given right of way.

In the above embodiment, an emergency vehicle 20 transmits information on its destination within the particular area 5 to the information processing apparatus 10, before entering the particular area 5. Within the particular area 5, however, a system may be established in which, when the dispatch of an emergency vehicle 20 is requested, information on its destination is also transmitted to the information processing apparatus 10. In this case, the information processing apparatus 10 can manage an emergent incident, an accident, or the like that has occurred within the particular area 5, and cause a lead vehicle 30A to lead the emergency vehicle 20 when the emergency vehicle 20 enters the particular area 5, without having to acquire information on the destination from the emergency vehicle 20.

Further, although in the above embodiment a lead vehicle 30A leads an emergency vehicle 20 within the particular area 5, the method according to the present disclosure may be performed without using the lead vehicle 30A. For example, in a case in which the emergency vehicle 20 has an automated driving function equivalent to that of automated driving vehicles 30 that drive within the particular area 5, the lead vehicle 30A may be omitted. The controller 12 can monitor the movement of the emergency vehicle 20 within the particular area in real time using positional information acquired from the emergency vehicle 20 and sensors installed on and in the vicinity of the road, without dispatching a lead vehicle 30A. In this case, the controller 12 of the information processing apparatus 10 may control automated driving vehicles 30 so as not to impede the movement of the emergency vehicle 20, based on the current position of the emergency vehicle 20.

In the above embodiment, the controller 12 of the information processing apparatus 10 transmits, to an emergency vehicle 20, instructions to stop or reduce the volume of the siren 23 of the emergency vehicle 20. In the siren control method according to the present disclosure, however, the emergency vehicle 20 itself can detect that it has entered the particular area 5, and stop the siren 23 or reduce the volume of the siren 23. In this case, positional information detected by the position detector 24 of the emergency vehicle 20 is a type of primary information indicating that it has entered the particular area 5, and upon acquisition of the primary information, the controller 22 of the emergency vehicle 20 executes control to stop or reduce the volume of the siren 23.

The invention claimed is:

1. A siren control method for an emergency vehicle that is executed by a controller, the siren control method comprising:

upon acquisition of primary information indicating that the emergency vehicle during emergency driving has satisfied a condition that the emergency vehicle has entered a particular area in which right of way may be given and/or a condition that the emergency vehicle has shifted into a specific driving mode in which right of way may be given within the particular area, stopping a siren of the emergency vehicle or reducing a volume of the siren of the emergency vehicle, wherein the particular area is an area in which driving on a road is restricted only to vehicles with automated driving functions, with an exception of emergency vehicles.

2. The siren control method according to claim 1, wherein no traffic lights or road signs are present in the particular area.

3. The siren control method according to claim 1, wherein the specific driving mode includes a mode in which the emergency vehicle is led by a mobile object.

4. The siren control method according to claim 3, wherein the mobile object includes a lead vehicle or an unmanned aircraft that is configured to lead the emergency vehicle.

5. The siren control method according to claim 3, comprising
upon acquisition of secondary information indicating that the emergency vehicle is approaching the particular area before the acquisition of the primary information, allocating, by the controller, the mobile object to the emergency vehicle and causing the mobile object to travel to the vicinity of an entrance through which the emergency vehicle is to enter the particular area.

6. The siren control method according to claim 1, comprising
controlling, by the controller, vehicles in the vicinity of the emergency vehicle so as not to impede driving of the emergency vehicle.

7. The siren control method according to claim 1, comprising,
in a case in which the emergency vehicle enters a parking lot, transmitting, by the controller, instructions to move vehicles within the parking lot that impede driving of the emergency vehicle.

8. The siren control method according to claim 7, wherein, within the particular area, the parking lot is equipped with a robot configured to move parked vehicles.

9. The siren control method according to claim 1, comprising
controlling, by the controller, pedestrian guidance equipment placed on a road to thereby guide pedestrians not to impede driving of the emergency vehicle.

10. The siren control method according to claim 9, wherein the pedestrian guidance equipment includes road studs with light emitters configured to use light to indicate a zone on the road for pedestrians to pass through.

11. The siren control method according to claim 1, wherein the controller is included in an information processing apparatus configured to control driving of vehicles within the particular area.

12. The siren control method according to claim 1, wherein the controller is included in a computer mounted in the emergency vehicle.

13. An information processing apparatus, comprising:
a communication interface configured to be communicable with an emergency vehicle; and
a controller configured to
acquire, via the communication interface, primary information indicating that the emergency vehicle during emergency driving has satisfied a condition that the emergency vehicle has entered a particular area in which right of way may be given and/or a condition that the emergency vehicle has shifted into a specific driving mode in which right of way may be given within the particular area, and
upon acquisition of the primary information, transmit instructions to stop a siren of the emergency vehicle or to reduce a volume of the siren of the emergency vehicle to the emergency vehicle via the communication interface,
wherein the particular area is an area in which driving on a road is restricted only to vehicles with automated driving functions, with an exception of emergency vehicles.

14. The information processing apparatus according to claim 13, wherein no traffic lights or road signs are present in the particular area.

15. The information processing apparatus according to claim 13, wherein the specific driving mode includes a mode in which the emergency vehicle is led by a mobile object.

16. The information processing apparatus according to claim 15, wherein the mobile object includes a lead vehicle or an unmanned aircraft that is configured to lead the emergency vehicle.

17. The information processing apparatus according to claim 15, wherein
the communication interface is configured to be communicable with the mobile object, and
upon acquisition of information indicating that the emergency vehicle is approaching the particular area, the controller allocates the mobile object to the emergency vehicle and causes the mobile object to travel to the vicinity of an entrance through which the emergency vehicle is to enter the particular area.

18. A non-transitory computer readable medium storing a program configured to cause a computer, upon acquisition of primary information indicating that an emergency vehicle during emergency driving has satisfied the condition that the emergency vehicle has entered a particular area in which right of way may be given and/or the condition that the emergency vehicle has shifted into a specific driving mode in which right of way may be given within the particular area, to perform processing for stopping a siren of the emergency vehicle or for reducing the volume of the siren of the emergency vehicle,
wherein the particular area is an area in which driving on a road is restricted only to vehicles with automated driving functions, with an exception of emergency vehicles.

* * * * *